J. G. NOLEN & J. E. SHEPHERD.
FIRE PROTECTION SIGNAL SYSTEM.
APPLICATION FILED SEPT. 3, 1909.
998,588.
Patented July 18, 1911.
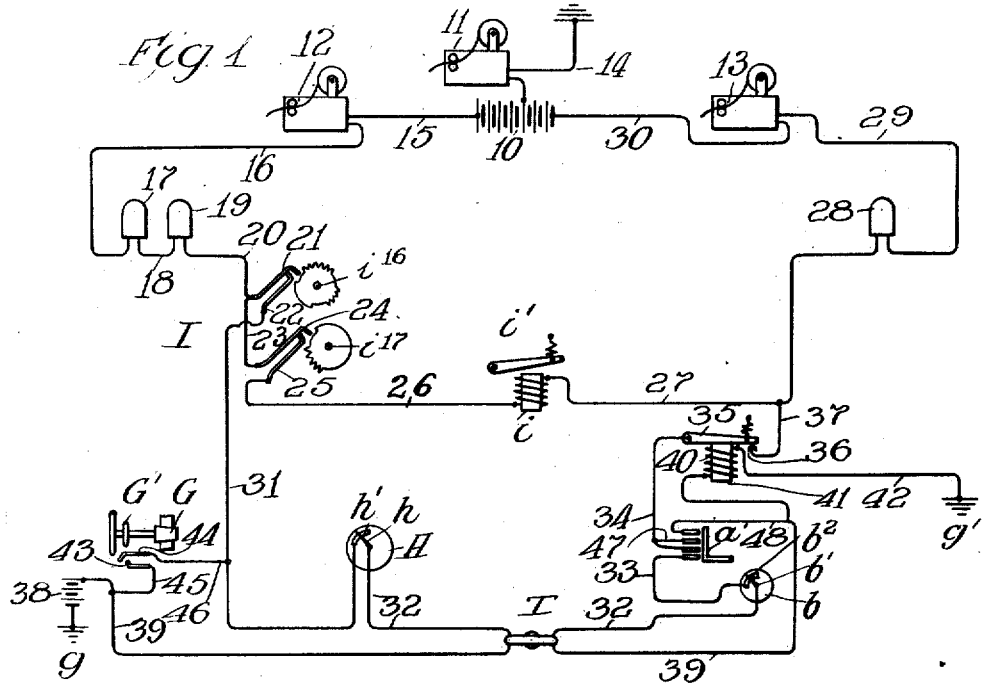
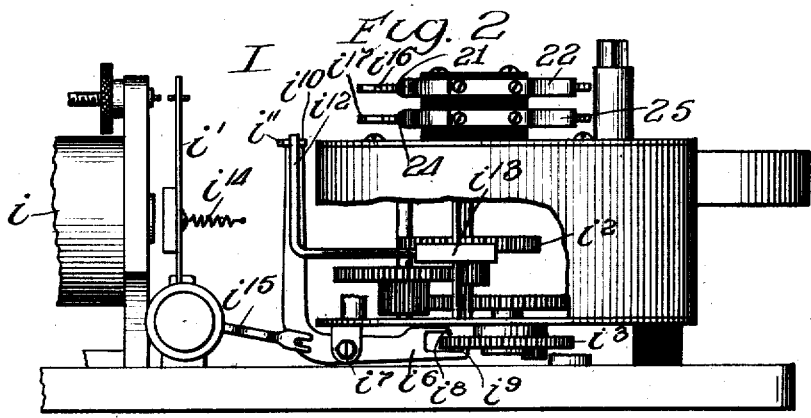
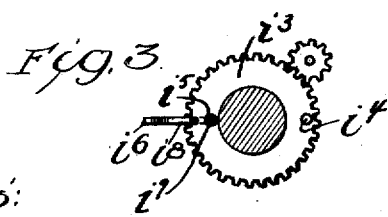

UNITED STATES PATENT OFFICE.

JAMES G. NOLEN, OF NEW YORK, N. Y., AND JOHN E. SHEPHERD, OF CHARLOTTESVILLE, VIRGINIA, ASSIGNORS, BY DIRECT AND MESNE ASSIGNMENTS, TO AUTOMATIC FIRE PROTECTION COMPANY, OF NEW YORK, N. Y., A CORPORATION OF MAINE.

FIRE-PROTECTION SIGNAL SYSTEM.

998,588.      Specification of Letters Patent.      Patented July 18, 1911.

Original application filed April 25, 1904, Serial No. 204,779. Divided and this application filed September 3, 1909. Serial No. 516,031.

*To all whom it may concern:*

Be it known that we, JAMES G. NOLEN and JOHN E. SHEPHERD, citizens of the United States, respectively residing at New York city, in the county of New York and State of New York, and at Charlottesville, in the county of Albemarle and State of Virginia, have invented certain new and useful Improvements in Fire-Protection Signal Systems, of which the following is a specification.

Our invention relates to improvements in fire protection signal systems, and contemplates the provision of an electric signaling system particularly adapted for use in conjunction with a fire-extinguisher system and supervisory appliances therefor, shown in our Patent No. 939,293, dated Nov. 9, 1909, of which this application is a division.

Our present invention contemplates the provision of suitable circuits and devices for control by alarm initiators, and for self-control, to occasion the transmission of a signal to a central station upon the operation of the signal initiating devices or trouble in the circuit itself.

In the drawings, Figure 1 is a diagrammatic view, showing schematically an embodiment of our invention; Fig. 2 is a side elevation with parts broken away of a signal transmitter or master-box; and Fig. 3 is a detail of a part of said transmitter.

Referring to Fig. 1, 10 indicates a central battery, preferably located in the central station in conjunction with three signaling and recording instruments, 11, 12, and 13. The instrument 11 is arranged in a ground connection, 14, including the central battery 10, while the instruments 12 and 13 are arranged directly in a main circuit on the left and right sides respectively of the battery 10. The main circuit extends from battery 10, by wire 15, to the recording instrument 12, and thence through wires 16, 18, and 20, which may include in series suitable signal-transmitting devices, 17 and 19 (in the form of ordinary transmission boxes arranged to supervise and to be suitably tripped by any suitable apparatus, not necessary to be described), to a pen, 21, of a master-box, I, (which said pen has associated therewith an anvil, 22, for purposes to be described), from said pen by wire 23, through the pen and anvil 24, 25, of a second signal wheel of said transmitter box, I, by wire 26 to an electro-magnet, $i$, thence by wire 27 to a suitable ordinary transmitting box 28, which might be a manual box, thence by wire 29 to the recorder 13, and from its terminal by wire 30 back to the battery. A normally closed local shunt or subcircuit is provided around the portion of the main circuit including the magnet $i$, such shunt including wire 31 (connected to the anvil 22), the segment $h'$ of a pressure gage H, the hand $h$ of said gage, wire 32, one side of one or more "crossing" thermostats T, the hands $b'$ of a second pressure gage $b$, the segment $b^2$ of which has connection by wire 33 with the two lower normally immersed points of a series of contacts connected with the thermometer $a'$, wire 34, the armature 35 of an electro-magnet (41), front contacts 36 and wire 37 connected to wire 27. Thus the armature 35 of magnet 41 forms in effect a circuit-breaker, held forward in circuit closing condition against the tension of its spring by the magnet 41 in another independent, local circuit, as long as said magnet is energized. Said independent local circuit is provided preferably grounded at both ends and extending as follows: from the ground, $g$, to a local battery, 38, by wire 39, through the second side of the thermostats T, through the coil of the electro-magnet 41, the opposite terminal of which has connection by wire 42 to ground at $g'$.

The pressure gages, H and $b$, are typical of pressure gages such as are associated with risers and pressure tanks of a fire-extinguisher system, the thermometer $a'$, typical of a temperature registering device for such system, the boxes 17, 19, and 28 representing any suitable transmission boxes for manual or automatic operation in association with the line circuit. The thermostat T is typical of any device for operation to create a bridge or cross between the shunt and local circuit wires 32, 39; and other shunting devices may be provided as, for example, the apparatus associated with the fire-extinguisher gate-valve G, and high temperature contacts associated with the thermometer $a'$. The gate-valve G carries a stem G' arranged for coöperation with switch contacts 43 and 44 to close the same as the valve is moved to closed position, such contacts having respective connection by wires 45 and 46 with the local circuit 39 and the shunt 31. The two normally exposed high-temperature contacts of the thermometer are connected through wires 47 and 48 respectively with the wires 34 and 39.

Thus it will be seen that the circuits described provide a main circuit including a source of electrical supply and signal responsive instruments, the pens, 24, 25, of one signal wheel and an operating magnet, $i$; a subcircuit parallel to the portion of the main circuit including the operating magnet, $i$, such subcircuit including signal pens, 21, 22, circuit breakers, illustrated in the form of pressure gages, H and $b$, and an electroresponsive circuit breaker (35—36) normally held in closed position by the magnet 40, dependent upon operative continuity of a local independent circuit; and means in the form of thermostats T, gage-valve switches (43—44), and the like, for cross connecting the subcircuit and the independent local circuit to establish a ground path which will exclude the magnet 40.

The operating magnet $i$ forms the actuating element for the controlling devices of an automatic signal-transmitting box, indicated at I, and comprising spring or other motor $i^2$, which, as shown, includes the pinion $i^3$ mounted under the base of the motor and having formed therein two apertures $i^4$ and $i^5$ diametrically opposed and at different radial distances from the axis of the pinion, for coöperation with a bell-crank lever, $i^6$, connected as at $i^7$ and having inturned end fingers $i^8$ and $i^9$, arranged for engagement respectively with the perforations $i^4$ and $i^5$ of the pinion. The forward end of the lever $i^6$ extends upward and is provided with a horizontal extremity divided to form two prongs $i^{10}$ and $i^{11}$, suitably separated and arranged in operative proximity to a stem $i^{12}$ projecting from the escapement member $i^{13}$ of the clockwork. The construction of the whole is such that the portion of the lever in front of its pivot $i^7$ may be elevated to depress finger $i^8$ into engagement with perforation $i^4$ of the wheel to hold the motor mechanism against movement, the prong $i^{11}$ at the same time springing in front of the stem $i^{12}$ to prevent the escapement from operating, or the forward portion of the lever $i^6$ may be depressed to raise the lower finger $i^9$ into engagement with perforation $i^5$ in the pinion, the prong $i^{10}$ at the outer end of said lever moving to intercept the movement of the lever $i^{12}$ of the escapement. When neither of the finger ends $i^8$ or $i^9$ is in engagement with its perforation in the pinion $i^3$, that is to say, when the imperforate portion of the pinion positions the lever $i^6$ at the middle of its throw, the stem $i^{12}$ may vibrate between the prongs $i^{11}$ and $i^{10}$.

The armature $i'$ normally held in retracted position by a spring $i^{14}$ is provided with a lever arm $i^{15}$ extending to and connected to the lever $i^6$ in front of the pivot $i^7$, and accordingly the train in its normal condition is held as indicated in Fig. 2, that is to say, with the lower finger $i^9$ in engagement with the perforation $i^5$. It will now be apparent that attraction and maintenance of the armature $i'$ in attracted position will free the signaling train for a half revolution of the pinion $i^3$, while attraction and immediate release of the armature will free the train for a complete revolution of the pinion $i^3$.

The train is connected to drive two signal wheels $i^{16}$ and $i^{17}$, which may be mounted on the same shaft, and geared to rotate at twice the speed of the pinion $i^3$. Each of the wheels is provided with a toothed portion and an elevated peripheral portion or elongated tooth, the elevated portion of each wheel being coextensive with and in position corresponding to the toothed portion of the other wheel. The upper wheel $i^{16}$ has associated therewith the contact device 21 and 22, and the lower wheel $i^{17}$ has associated with it contacts 24 and 25 arranged in circuit as above described.

It will now be apparent that the system stands normally in the position with the armature 35 of magnet 40 closed upon its contact through the normal segregation of the independent ground circuit from the line circuit, and with the magnet $i$ shunted by the low resistance shunt circuit so that it stands practically inert or deënergized. Accordingly, signaling operations in the main circuit may be performed through the agency of boxes 17, 19, and 28, without disturbance of the automatic transmitter controlled by the operating magnet $i$. Should, however, the continuity of the subcircuit be broken through the operation of the thermometer or pressure-gage, all of the line current will flow through the magnet $i$, causing its effective energization, and releasing the transmitter to cause a complete rotation of the signal wheels $i^{16}$ and $i^{17}$. Under these conditions, only the switch contacts 24 and 25 are in an energized circuit, so that the signal transmitted will be simply that of the lower wheel, that is to say, the number of the box operated, followed by a long "rundown." When the conditions are so restored that the subcircuit is again completed, the magnetism of the electro-magnet $i$ will be so reduced that its armature $i'$ will be attracted by its spring and the controlling devices of the motor moved to permit another revolution of the number wheel. It will be noted, however, that now the circuit is complete through both the subcircuit and the main circuit, so that both pairs of pens of the two signal wheels receive current when closed and the signal transmitted to the central station will be the aggregate signal of the two wheels, namely: the box number thrice repeated.

Under other conditions, for instance, when the valve q is closed, or a thermostat fuses, a cross is established between the wires 39 and 32. Under such conditions, the current from the battery 38 is partially diverted into the independent ground circuit taking the cross wherever offered to the subcircuit, and finds its way to the main circuit and thence to the ground through the ground connection and back to the battery. By this diversion of a portion of the current, the magnet 41 is so weakened that it is unable to hold its armature 35 against the tension of its spring and therefore said armature is retracted, breaking the subcircuit from contact point 36. Consequently, the effect of a cross is to break the subcircuit thereby to cause the transmission to the central station of the same signal as when one of the devices included in the subcircuit is operated to break the same. Should, however, the "short" be removed and the circuit restored so that the current of the battery 38 again traverses its normal independent path, the magnet 41 is again energized and closes the subcircuit accordingly causing the transmission of the second "round" of the box to occasion the transmission of the restoration signal above described. If a "break and make" thermostat were employed this result would also follow from its signal initiator.

It will now be apparent that our system provides for the sending of signals to the central station upon the occurrence of the predetermined abnormal condition and causes the transmission of a different signal from the same instrument upon the restoration of the normal initially prevailing condition.

While we have herein described in some detail a particular embodiment of our invention, we do not desire to be understood as limiting ourselves to the details shown further than is specified in the claims.

What we claim is:

1. In an alarm system, a main circuit including a source of electrical supply, and a signal responsive instrument; a sub-circuit parallel to a portion of the main circuit; a signal transmitting apparatus having an actuating magnet in the portion of the main circuit paralleled by the sub-circuit, arranged to become operative on the rupture of the sub-circuit; a circuit breaker in the sub-circuit; a local independent circuit including a source of current supply; and means in said local circuit for controlling the action of the circuit breaker in the sub-circuit.

2. In an alarm system, a main circuit including a source of electrical supply and a signal responsive instrument, a ground connection from said main circuit, a sub-circuit parallel to a portion of the main circuit, a signal transmitting device having an actuating magnet in the portion of the main circuit paralleled by the sub-circuit, said magnet being arranged to actuate the transmitting device upon the rupture of the sub-circuit, a circuit breaker in the sub-circuit, an independent local circuit having a ground connection and including a source of electrical supply, a magnet in said independent circuit controlling the circuit breaker of the sub-circuit, and means for establishing a cross between said independent circuit and the sub-circuit.

3. In an alarm system, a main circuit including a source of electrical supply and a signal responsive instrument, a sub-circuit in parallel to a portion of the main circuit, a signal transmitting means in the sub-circuit, operating means for said signal transmitting means comprising an electro-magnet common to both and included in the portion of the main circuit paralleled by the sub-circuit, a circuit breaker in the sub-circuit, a source of electrical supply therefor, and a means in said circuit for controlling the action of the circuit breaker of the sub-circuit.

4. In an alarm system, a main circuit having a ground connection, a source of electrical supply for said circuit, a signal responsive instrument therein, a sub-circuit parallel to a portion of the main circuit; a signal transmitter having two sets of instrumentalities, one arranged to operate on the main circuit and the other on the sub-circuit; and electro-magnetic actuating device for said transmitter arranged in that portion of the main circuit paralleled by the sub-circuit, a circuit breaker in the sub-circuit, a local independent circuit having a ground connection, a source of electrical supply for said independent circuit, a magnet in said independent circuit controlling the circuit breaker of the sub-circuit, and means for establishing a cross between said independent circuit and said sub-circuit.

5. In an alarm system, a main circuit, including a source of electrical supply and a signal receiving instrument, a sub-circuit in parallel with a portion of the main circuit, a signaling apparatus including two sets of contact members, one set arranged in the main circuit and the other in the sub-circuit, and actuating devices comprising contact controlling mechanism, a magnet and an armature for said magnet arranged and adapted when moved in either direction to actuate the contact controlling mechanism, said magnet being arranged in that part of the main circuit paralleled by the sub-circuit and adapted to attract its armature when the sub-circuit is broken and to release it when the sub-circuit is reëstablished.

6. In an alarm system, a main circuit including a source of electrical supply and a signal receiving instrument, a sub-circuit in parallel to a portion of the main circuit, an electro-magnet in one of said circuits, arranged to be influenced by the breaking or closing of the sub-circuit to vary the position of its armature, a signal transmitter having two sets of signaling instrumentalities one arranged to operate in the main circuit and the other in the sub-circuit, and connections between said signaling instrumentalities and the magnet armature whereby said instrumentalities are actuated by movement of the armature in either direction.

In testimony whereof we hereunto set our hands.

JAMES G. NOLEN.
JOHN E. SHEPHERD.

Witnesses for James G. Nolen:
E. J. SCHAEDLER,
F. A. CREAMER.

Witnesses for John E. Shepherd:
GEO. T. MAY, Jr.,
MARY F. ALLEN.

Copies of this patent may be obtained for five cents each, by addressing the "Commissioner of Patents, Washington, D. C."